(12) United States Patent
Dixon et al.

(10) Patent No.: US 8,105,096 B2
(45) Date of Patent: *Jan. 31, 2012

(54) ELECTRICAL METAL CLAD CONNECTORS AND METHODS OF USE

(75) Inventors: Mark Dixon, Carrollton, GA (US); James Tairney, Parker, CO (US); Kris Grube, Bloomington, IN (US); Shelton Herrell, Carrollton, GA (US); Mark Roden, Newnan, GA (US); Wilber F. Powers, Newnan, GA (US); Richard Temblador, Carrollton, GA (US); Kyle McGovern, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/009,920

(22) Filed: Jan. 20, 2011

(65) Prior Publication Data

US 2011/0183532 A1    Jul. 28, 2011

Related U.S. Application Data

(63) Continuation of application No. 12/640,042, filed on Dec. 17, 2009, now Pat. No. 7,901,222, which is a continuation of application No. 12/104,777, filed on Apr. 17, 2008, now Pat. No. 7,648,373.

(60) Provisional application No. 60/923,885, filed on Apr. 17, 2007.

(51) Int. Cl.
*H01R 9/00* (2006.01)

(52) U.S. Cl. ............ 439/98; 439/584; 174/67 R; 174/59

(58) Field of Classification Search ............ 439/98, 439/584, 583; 174/67 R, 59
See application file for complete search history.

(56) References Cited

U.S. PATENT DOCUMENTS

| | | | |
|---|---|---|---|
| 3,567,843 A | 3/1971 | Collins et al. | |
| 5,763,833 A | 6/1998 | Bawa et al. | |
| 6,034,325 A | 3/2000 | Nattel et al. | |
| 6,354,851 B1 | 3/2002 | Bachle | |
| 7,041,909 B2 * | 5/2006 | Hiel et al. | 174/88 R |
| 7,648,373 B2 | 1/2010 | Dixon et al. | |
| 7,901,222 B2 | 3/2011 | Dixon et al. | |
| 2006/0054340 A1 | 3/2006 | Auray et al. | |
| 2006/0054341 A1 | 3/2006 | Auray et al. | |
| 2007/0102845 A1 | 5/2007 | Dodwell et al. | |
| 2007/0205601 A1 * | 9/2007 | Shemtov | 285/151.1 |
| 2008/0268687 A1 | 10/2008 | Dixon et al. | |
| 2009/0025977 A1 * | 1/2009 | Anderson et al. | 174/653 |
| 2009/0272575 A1 | 11/2009 | Bae | |
| 2010/0159721 A1 | 6/2010 | Dixon et al. | |

OTHER PUBLICATIONS

NERAC Search Report No. 09186068-1, May 19, 2006, John C. Pires, 41 pgs.
NERAC Search Report No. 09206495-1, May 30, 2006, John C. Pires, 31 pgs.

* cited by examiner

*Primary Examiner* — Gary F. Paumen
(74) *Attorney, Agent, or Firm* — Merchant & Gould

(57) ABSTRACT

A cable connector may be disclosed. The connector may include a connector housing having a first threaded portion and an insert having compression voids. The insert may be configured for insertion into the connector housing. The connector may also include a compression nut configured to engage the first threaded portion. The compression nut may be configured to compress the insert to close the compression voids when the compression nut engages the first threaded portion. The cable connector may also include an end stop having an adjustable throat diameter configured to adjust in proportion to an adjustable inner diameter of the cable connector as the connector engages or armor of an armored cable.

24 Claims, 22 Drawing Sheets

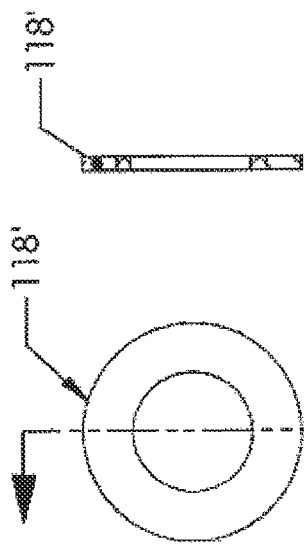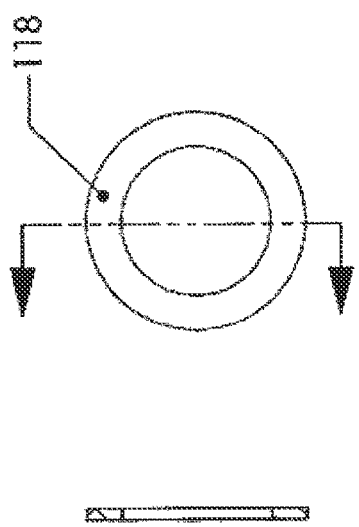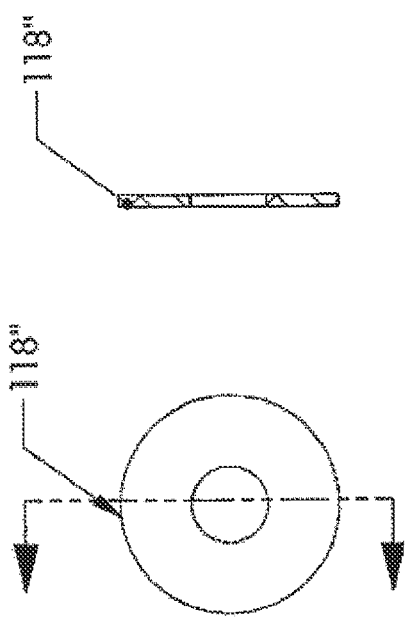
FIG. 6A
FIG. 6B
FIG. 6C

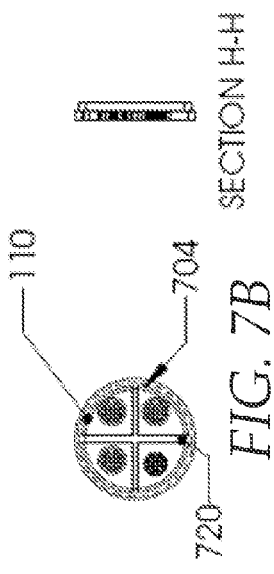
FIG. 7A
FIG. 7B
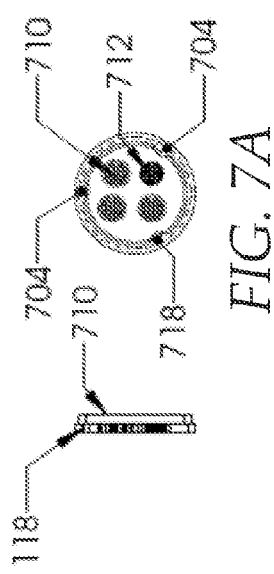
FIG. 7C
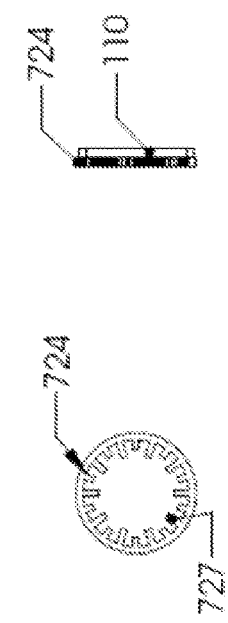
FIG. 7D
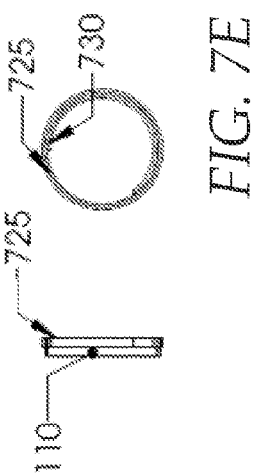
FIG. 7E
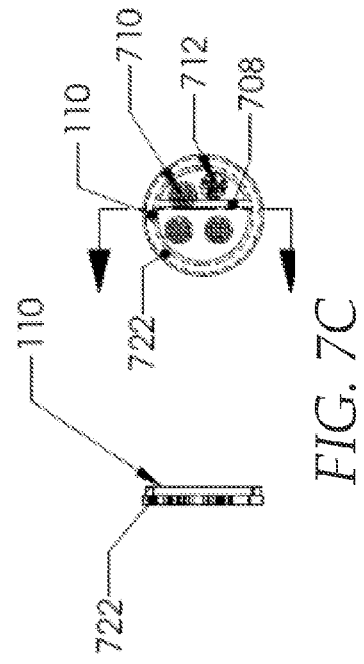

ELECTRICAL METAL CLAD CONNECTORS AND METHODS OF USE

CROSS-REFERENCE TO RELATED APPLICATIONS

This application is a continuation of U.S. patent application Ser. No. 12/640,042, filed on Dec. 17, 2009, now U.S. Pat. No. 7,901,222, which is a continuation of U.S. patent application Ser. No. 12/104,777, filed on Apr. 17, 2008, now U.S. Pat. No. 7,648,373, which claims the benefit of U.S. Provisional Application No. 60/923,855, filed on Apr. 17, 2007, each of which is incorporated herein by reference in its entirety.

BACKGROUND

Conventional electrical metal clad (MC) fittings or connectors may require several connector sizes and/or multiple parts to engage one armored cable diameter or a range of armored cable diameters. This requires distributors to inventory several connector parts or connectors for each diameter range and/or each trade size. To reduce the overall number of connectors needed and to maximize existing resources, connectors are commonly rated for use with a variety of cables and conduits. For instance, MC connectors are listed for use with MC cable, flexible metal conduit (FMC), and in some cases Nonmetallic (NM) Cable.

Dimensional criteria for selecting an appropriate connector may include trade size (knockout (KO)), cable diameter (i.e. jacket and/or armor diameter) range, and end stop (throat) diameter. For example, when a throat diameter is too large in a connector, the throat diameter will permit cables with smaller armor diameters to pass through the end stop. In contrast, when the end-stop is too small, the number and size of conductors that can pass through the end-stop are limited. Thus, the number of connectors needed to cover an available cable size range is increased. Also, connector assemblies that have "numerous" parts or pieces have an increased tendency for creating worker frustrations or even work stoppage should any of these pieces become missing or lost altogether.

Additionally, features that minimize or eliminate installation errors are not currently available among conventional MC connectors. For instance, with respect to interlocked armor cable, one end of the cable has a tendency to expand to a larger diameter than the other end of the same cable during termination. Thus, depending upon which end is being terminated, interlocked armor cable may require two (2) different connector sizes for the opposite ends of the cable. Further, with regard to continuously welded and corrugated armor (CWA), connectors that use "thread-on" features were developed to provide intimate contact between the connector and the armor for sealing and electrical bonding. Other non-threaded fittings that are available for CWA usually have additional components or parts for creating a seal between the cable and the connector for hazardous location ratings, again adding costs and pieces that are not necessary for dry-location-only ratings. Thus, the introduction and rapid market growth of MC cables has exacerbated issues associated with the compatibility between connectors and cables.

SUMMARY

This Summary is provided to introduce a selection of concepts in a simplified form that are further described below in the Detailed Description. This Summary is not intended to identify key features or essential features of the claimed subject matter. Nor is this Summary intended for use in limiting the claimed subject matter's scope.

One or more cable connector(s) are disclosed. The connector may include a connector housing having an engaging portion and an insert having at least one compression void. The insert may be configured for insertion into the connector housing. The connector may also include a compression nut configured to engage the engaging portion. The compression nut may be configured such that when the compression nut engages the engaging portion the compression nut may exert an axial force on the insert. The axial force may cause the insert to deform in a radial direction and not in the axial direction. Deformation in the radial direction may include deforming the compression void thereby allowing the insert to change diameter. The cable connector may also include an end stop having an adjustable throat diameter configured to adjust in proportion to an adjustable inner diameter of the cable connector as the connector engages or retains armor of an armored cable.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 6a through 6c illustrate top and side views of various end stop discs sized for various armored cable outer diameters;

FIGS. 7a through 7e illustrate top and side views of various end stop discs;

DETAILED DESCRIPTION

Figure 1:
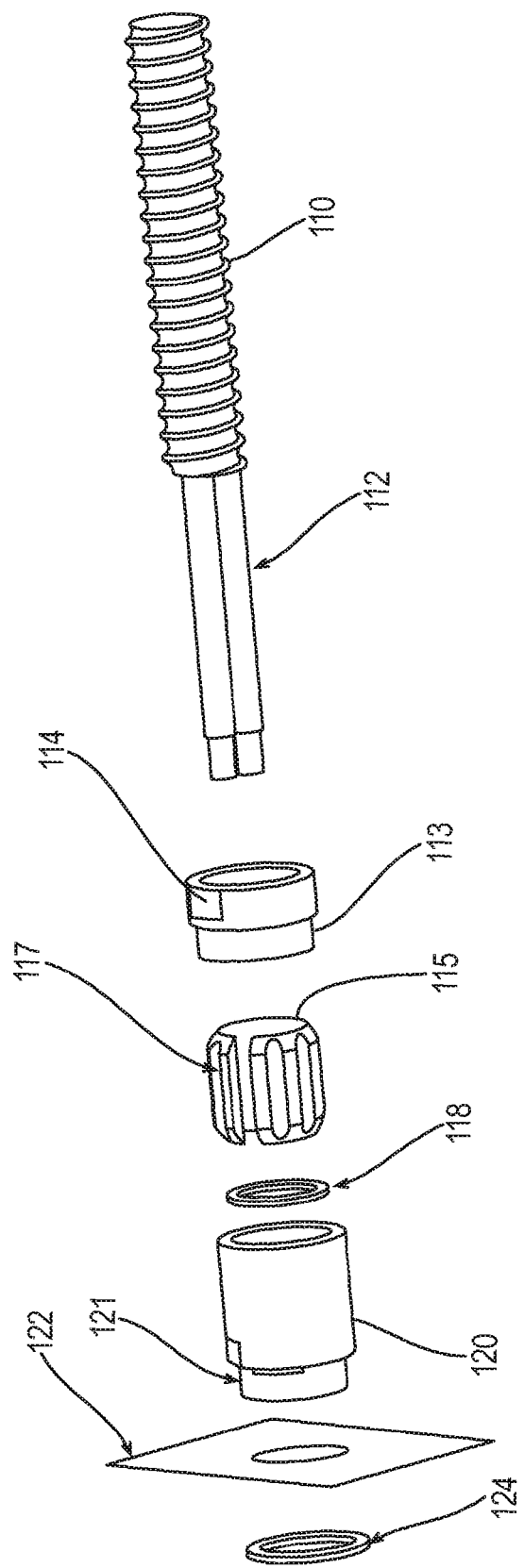
FIG. 1 is an exploded perspective view of a cable connector assembly application.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and substituting, reordering, or adding stages to the disclosed methods may modify the methods described herein. Accordingly, the following detailed description does not limit the invention. Instead, the proper scope of the invention is defined by the appended claims.

Referring now to the figures, FIG. 1 depicts an exploded perspective view of an application for a cable connector assembly, also referenced as cable connector 100 according to embodiments of the invention. Cable connector 100 includes, a connector housing 120 having an external threaded portion 121 and an internal threaded portion 119 (See FIG. 2), an end stop element or disc 118, an insert or gland 117 including compression relief voids or cavities such as an opening 116 (See FIG. 4) and/or grooves 115, a compression nut 114 (also called a compression housing) having an external threaded portion 113, and a lock nut 124 for engaging the external threaded portion 121. Note that opening 116 may also be referred to as a missing section. The missing section is void of material such that when insert 117 is compressed it deforms such that insert 117 may decrease in diameter by the closing of opening 116. Also, note that disc 118 may be a washer.

Cable connector 100 may be used to ground an armored cable 110 and secure armored cable 110, including conductors 112, to an enclosure 122. In addition, cable connector 100 may include attributes that may act as a barrier to prevent moisture and other contaminants from entering enclosure 122 and/or the connector 100. Enclosure 122 may be made from steel and may include structures such as junction boxes, panel boards, motor control enclosures, electrical distribution equipment, and other electrical enclosures. Connector components such as connector housing 120, insert 117, and compression nut 114 may comprise any electrically conductive material, such as aluminum or zinc plated steel. One or more of cable connector 100's components may also be tempered such as for example, by post annealing, or employing pre-tempered metal stock for which the parts may be fabricated.

Figure 2:
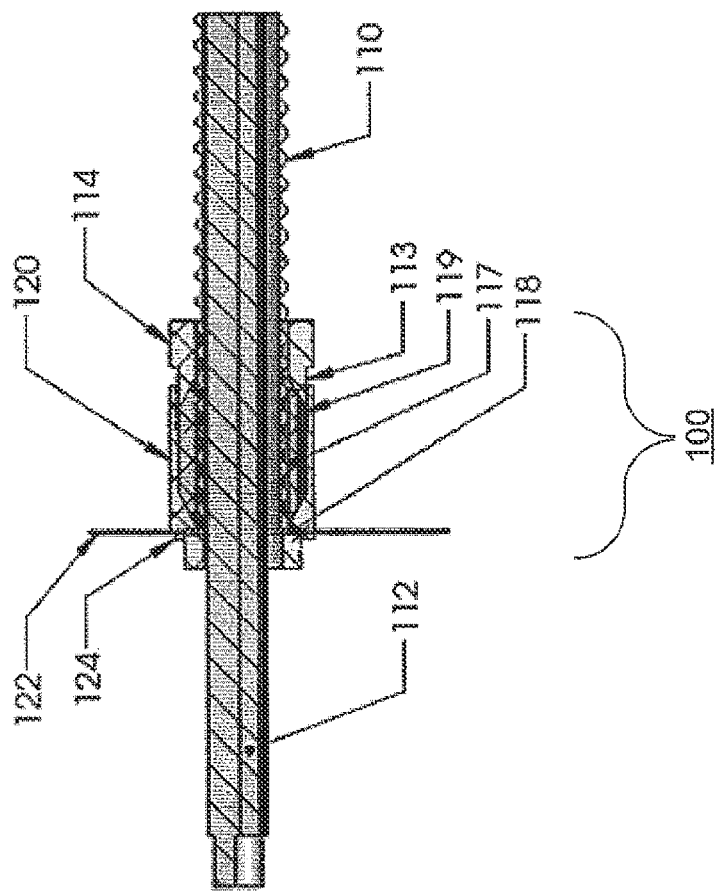
FIG. 2 is a cross-sectional view of the connector in an assembled and compressed position around the cable in the application of FIG. 1.
Figure 2:
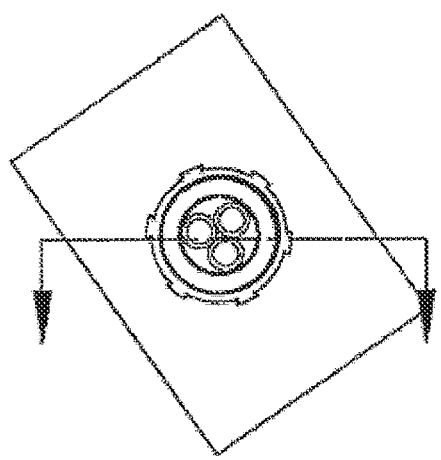

FIG. 2 is a cross-sectional view of cable connector 100 in an assembled and compressed position around armored cable 110 of FIG. 1. Here, end stop disc 118 may serve as an end stop for the armor of armored cable 110 while allowing conductors 112 to pass through the connector housing 120's top into enclosure 122. As internal threaded portion 119 is engaged with external threaded portion 113 of compression nut 114, insert 117 may close or compresses onto the armored cable as opening 116 diminishes in width. This adjustable insert construction may allow a single cable connector to cover a range of armored cable sizes, including multiple trade sizes, to contact armored cable 110's surface area, and to retain armored cable 110 from slipping out of cable connector 100. The user-friendly design may facilitate installation of cable connector 100 onto armored cable 110 without a user having to disconnect housing 120 from compression nut 114.

Installation may also be facilitated by a micrometer gauge associated with cable connector 100. Thus, a user may close cable connector 100 with the micrometer gauge allowing the user to set insert 117 at a predetermined diameter for armored cable 110. Cable connector 100 may be turned to a designated mark, armored cable 110 may then be inserted, and the user may then completely tighten cable connector 100.

Once cable connector 100 is tightened, a locking mechanism may be implemented to prevent compression nut 114 or housing 120 from backing out. For instance, a quick disconnect lock that engages threaded portion 113 and 119 or lock nut 124 may prevent them from backing out.

As shown in FIGS. 1 and 2, armored cable 110 may be of a type commercially available and may include electrical conductors 112 encased in an internal polymer sheath all of which may be covered by a flexible armor casing. The construction of armored cable 110 may be used in dry applications and may be modified to allow its use in damp environments and where corrosive gases and other elements are present. Such cables may be available in a variety of sizes having various numbers and sizes of conductors in order to accommodate varying circuit requirements.

Figure 3B:
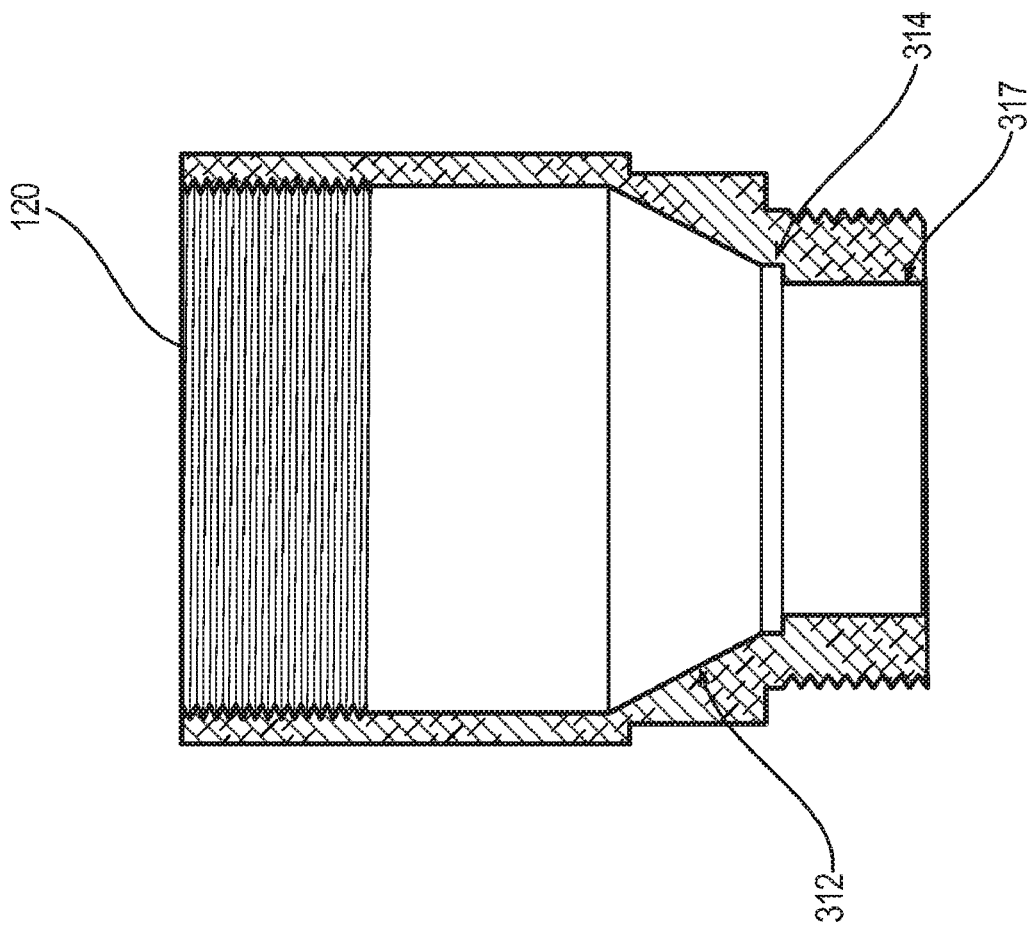
FIG. 3 is a cross-sectional view of the connector housing illustrated in the application of FIG. 1.
Figure 3A:
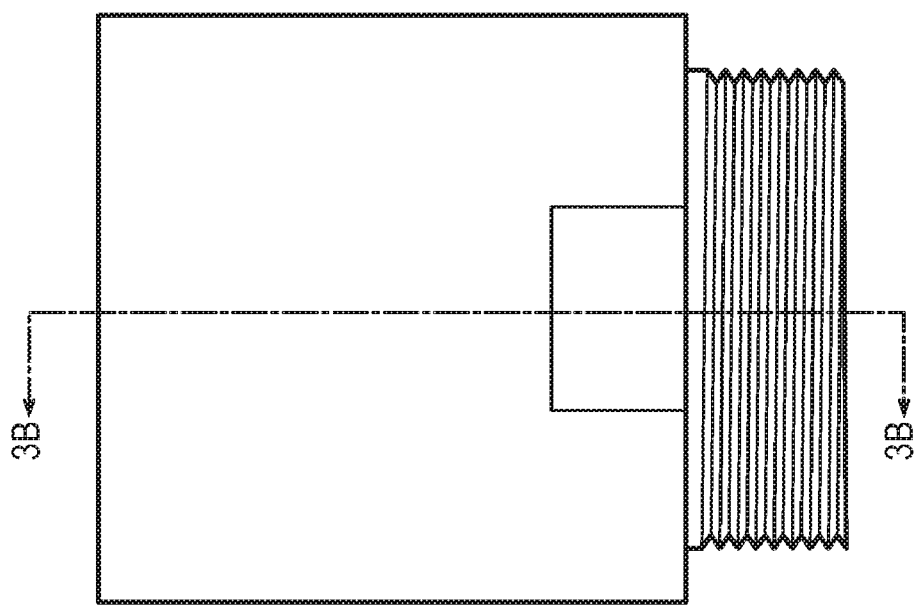

FIG. 3 is a cross-sectional view of connector housing 120 illustrated in cable connector 100 of FIG. 1 according to embodiments of the invention. Housing 120 may include a beveled internal surface 312 adjacent to a recessed shoulder 314. Recessed shoulder 314 may be formed to receive and restrict disc 118 (or an end stop washer) from entering a top inner bore area 317 of housing 120. Moreover, recessed bore shoulder 314 may serve as an end stop to restrict armored cable 110's armor casing or outer diameter range.

Figure 4:
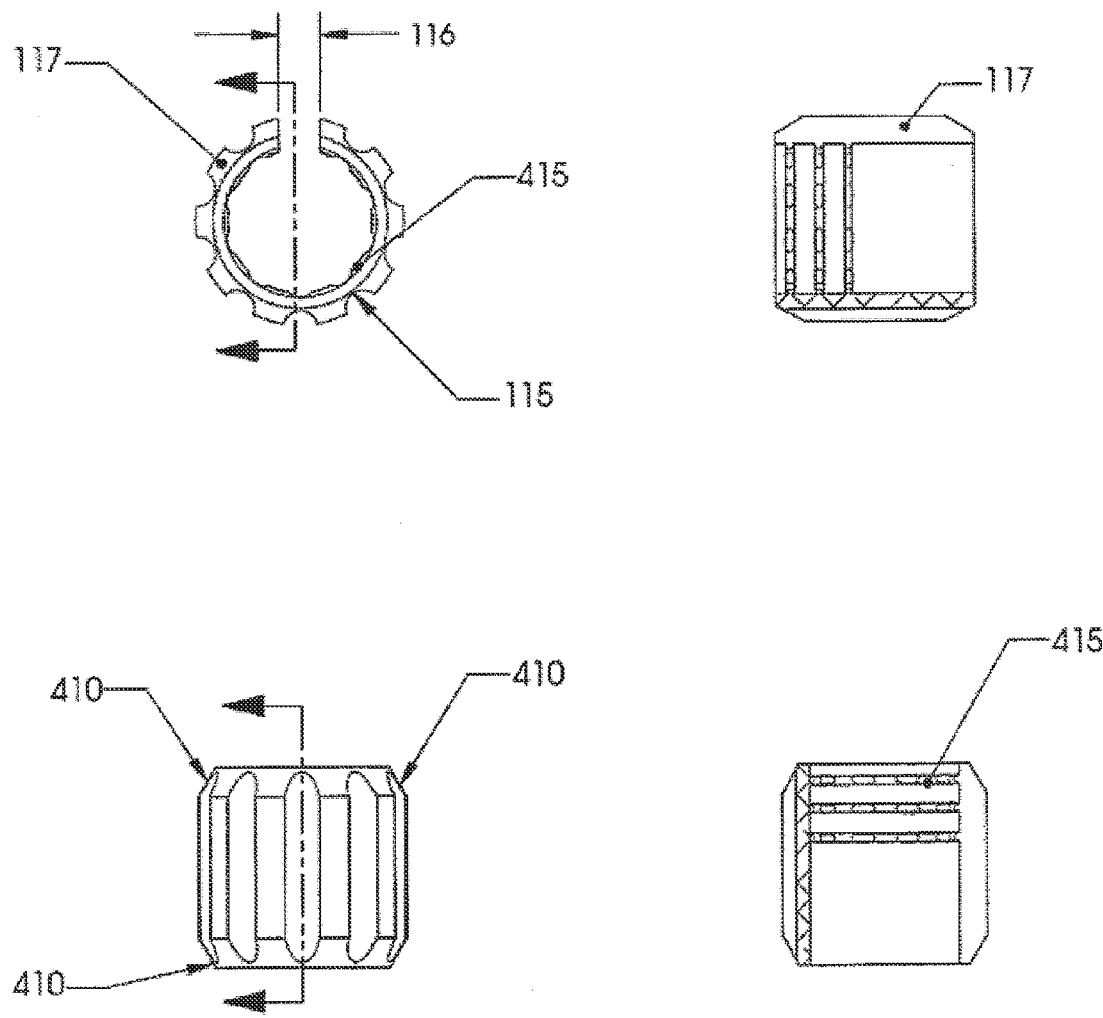
FIG. 4 illustrates a top, a side, and corresponding cross-sectional views of the insert illustrated in the application of FIG. 1.

FIG. 4 illustrates top, side, and related cross sectional views of insert 117 illustrated in FIG. 1. Insert 117 may include compression voids such as opening 116 (i.e. a missing section of material) and grooves 115 or slots. Each end of insert 117 may include a beveled surface 410, that when compressed between beveled internal surface 312 and a beveled surface of compression nut 114, may be configured to cause insert 117 to compress radially onto armored cable 110 inside cable connector 100 without substantially compressing axially. Insert 117 may also include ribs 415 extended from or threads 417 in an inner surface proximate to insert 117's entry end. Ribs 415 and/or threads 417 may facilitate retention of armored cable 110 within cable connector 100 once insert 117 and ribs 415 or threads 417 have been compressed onto armored cable 110.

Figure 5:
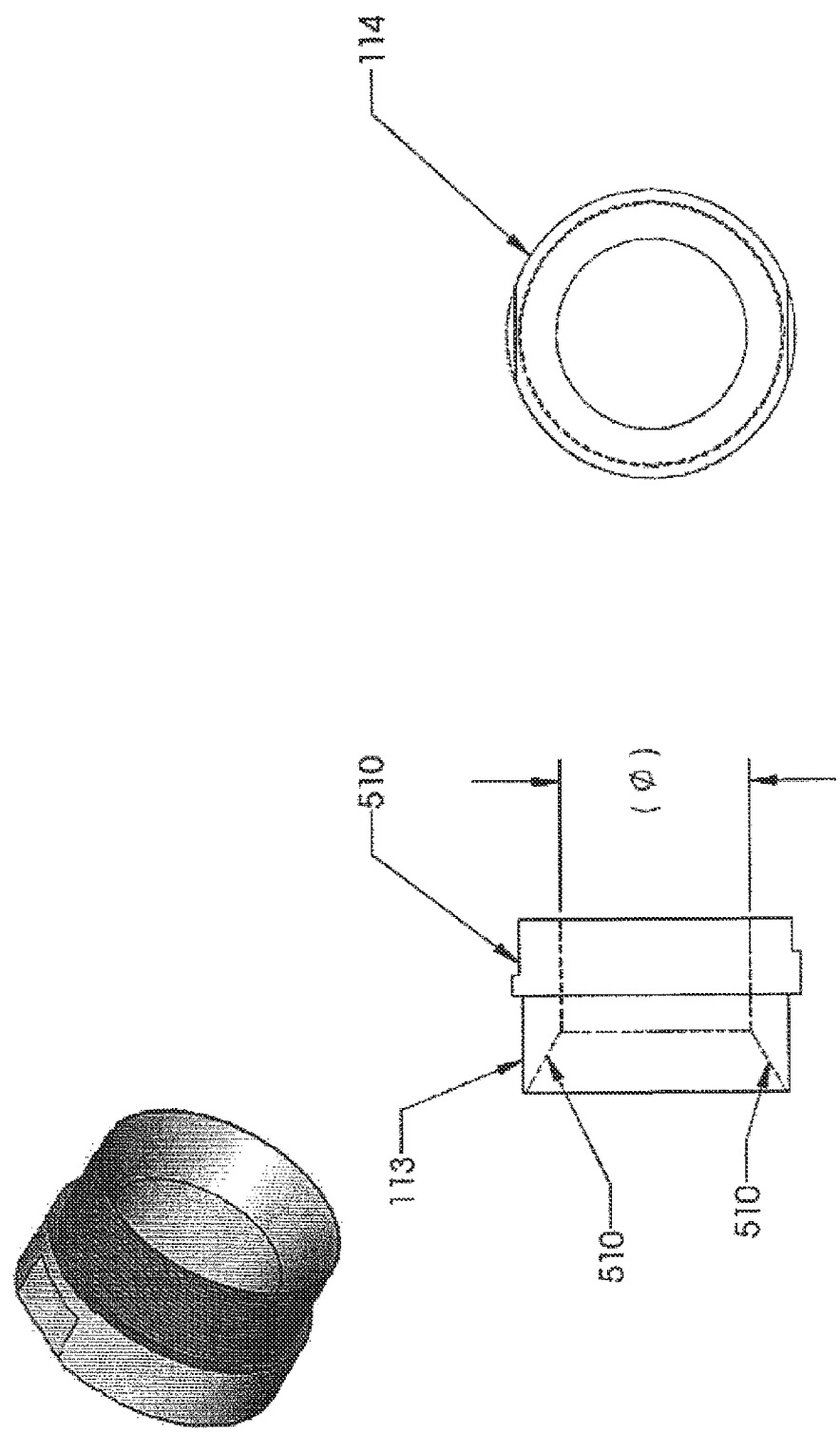
FIG. 5 illustrates top, side, and prospective views of the compression nut illustrated in the application of FIG. 1.

FIG. 5 illustrates perspective, top, and cross sectional views of compression nut 114 illustrated in FIG. 1. As described above, compression nut 114 may include a beveled inner surface 510 that when compressed against beveled surface 510 of insert 117, may cause insert 117 to compress radially onto armored cable 110 within cable connector 100.

During assembly of cable connector 100, beveled internal surface 312 and beveled surface 510 may mate with beveled surface 410 such that an axial force is applied to insert 117.

Beveled surfaces 312, 410, and 510 may convert the axial force to a radial force. The radial force may then cause insert 117 to deform in a radial direction and not in the axial direction. The radial deformation may be facilitated by deforming groove 115 and causing missing section 116 to close. By having insert 117 deform in the radial direction as apposed to the axial direction, more insert surface area may come into contact with armored cable 110 therein facilitating electrical bonding and sealing. If the insert deformed in the axial direction there may be a greater risk of less than a majority of the insert surface area contacting armored cable 110.

Also, having insert 117 deform in the radial direction may allow for one size insert 117 to cover a variety of cable diameters within a single trade size or across trade sizes. For example, a user working in the field may have one insert having a 2 inch trade size that can be used on various armored cables having different diameters such as 1.5 and/or 1.75 inches. For instance, insert 117 may compress onto an armored cable having a diameter smaller than that of insert 117 before insert 117 is deformed. Another example may be insert 117 be expanded to a diameter larger than the diameter of an undeformed insert 117. For instance the user may utilize a took to expand insert 117 via missing section 116 such that insert 117 may accommodate an armored cable having a diameter larger than insert 117 before the user increased its diameter.

FIGS. 6a through 6c illustrate top and side views of various end stop discs sized for armored cable 110 outer diameters according to various embodiments of the invention. End stop discs 118, 118', and 118" may restrict armor or armor casing of armored cable 110 from entering housing 120's top inner bore area 317. End stop discs 118' and 118" may stand alone as replacement parts dependent on armored cable 110's outer diameter. Furthermore, end stop discs 118, 118', and 118" may include break away segments to alter their inner diameters depending on armored cable 110's outer diameter. End stop discs 118, 118', and 118" may be made of any material, such as metal, plastic, or rubber.

FIGS. 7a through 7e illustrate top and side views of various end stop discs 718, 720, 722, 724, and 725 according to embodiments of the invention. End stop disc 718 may be formed with one or more tabs 704 to restrict armored cable 110 from passing through while allowing phase conductors 710 and a bare ground 712 to pass through. Similarly, end stop disc 720 may include cross hairs 706 that may restrict armored cable 110 from passing through while allowing phase conductors 710 and bare ground 712 to pass through. Furthermore, end stop disc 722 may include one or more cross bars 708 that restrict armored cable 110 from passing through while allowing phase conductors 710 and bare ground 712 to pass through.

Further, end stop disc 724 may include breakaway tabs 727 that restrict a range of armored cable outer diameters while allowing the conductors to pass through. End stop disc 725 may include spiral breakaway segments 730 that may be unwound to restrict a range of armored cable outer diameters from passing through while permitting the conductors to pass through.

Figure 8:
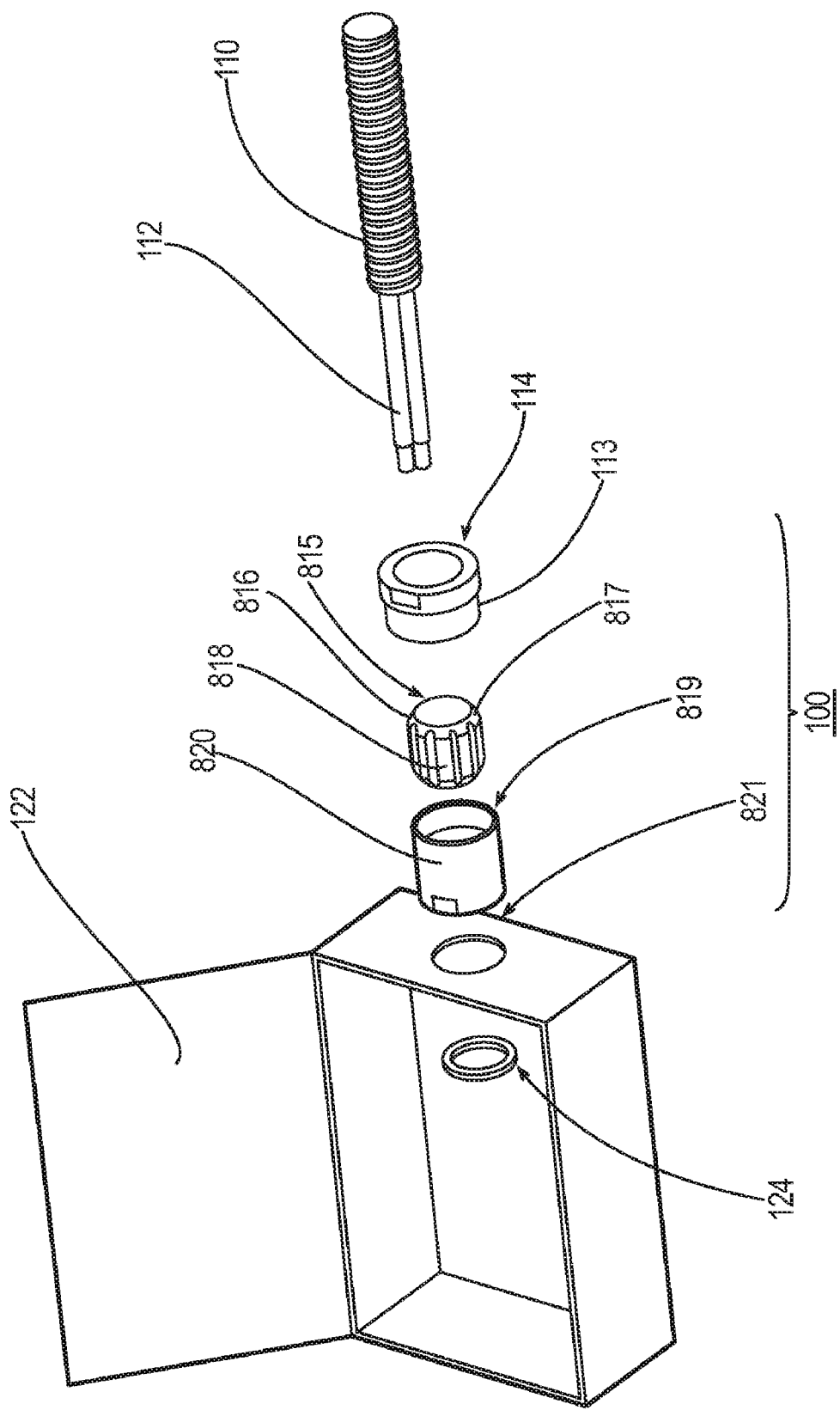
FIG. 8 is an exploded perspective view of a cable connector-electrical box application.

FIG. 8 depicts an exploded perspective view of a cable connector 800 consistent with embodiments of the invention. Cable connector 800 may include, a connector housing 820 having an external threaded portion 821 and an internal threaded portion 819, an insert or gland 817 including compression relief voids or cavities such as an opening 816 and grooves 818, retaining ribs 815, an adjustable end stop 810 (See FIG. 9), a compression nut 114 having an external threaded portion 113, and lock nut 124 for engaging external threaded portion 821. Note that end stop 810 may have an adjustable throat diameter and an adjustable inner diameter. Cable connector 800 may be used to ground armored cable 110 and secure armored cable 110, including conductors 112, to enclosure 122 or other structures. In addition, cable connector 800 may also be made capable of preventing moisture and other contaminants from entering enclosure 122.

Figure 9:
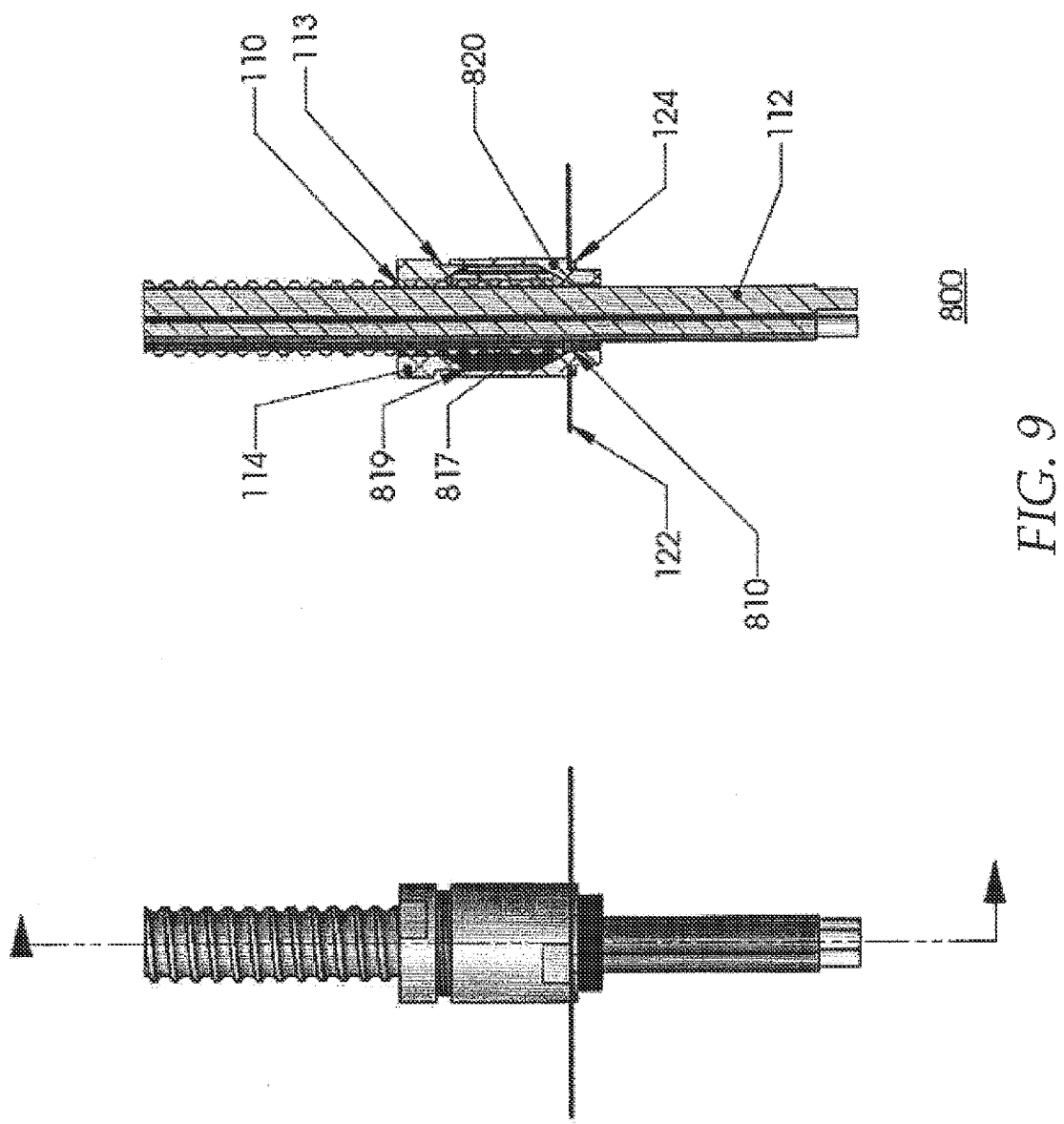
FIG. 9 is a cross-sectional view of the connector in an assembled and compressed position around the cable in the application of FIGS. 1 and 8.

FIG. 9 is a cross-sectional view of cable connector 800. Adjustable end stop 810 may serve as an end stop for the armor or casing of armored cable 110 while allowing the conductors 112 to pass through the top of connector housing 820 into enclosure 122. The connector's adjustable end stop 810 adjusts the throat diameter in proportion to the adjustment of the connector diameter as the connector is closed around or engages the armored cable jacket. As internal threaded portion 819 is engaged with external threaded portion 113 of compression nut 114, insert 817 may close or compress radially onto armored cable 110 or raceway as opening 816 diminishes. This adjustable insert construction may allow a single cable connector 800 to cover a range of armored cable sizes, contact armored cable 110's surface area, and help prevent armored cable 110 from slipping out of cable connector 800.

Figure 10:
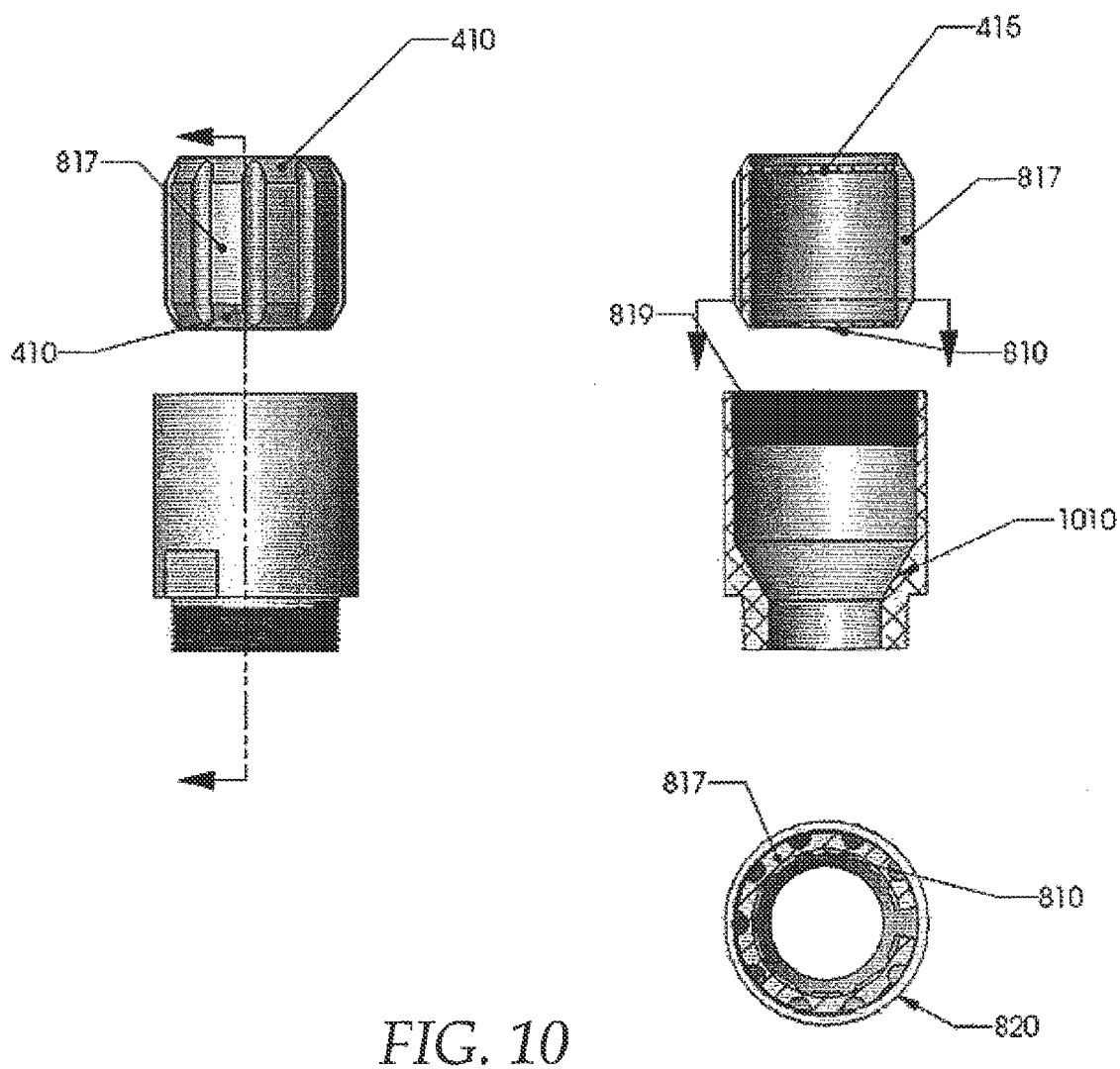
FIG. 10 is a side view and top and side cross-sectional views of the connector housing and insert illustrated in the application of FIGS. 1 and 8.

FIG. 10 is a cross-sectional view of connector housing 820 of FIG. 8 according to embodiments of the invention. Connector housing 820 may include a beveled internal surface 1010 configured to compress onto a beveled surface of insert 817 and cause insert 817 to compress. During compression of insert 817, adjustable end stop 810 may adjust its throat diameter in proportion to the armored cable raceway diameter to restrict armored cable 110's raceway from passing through.

Figure 11:
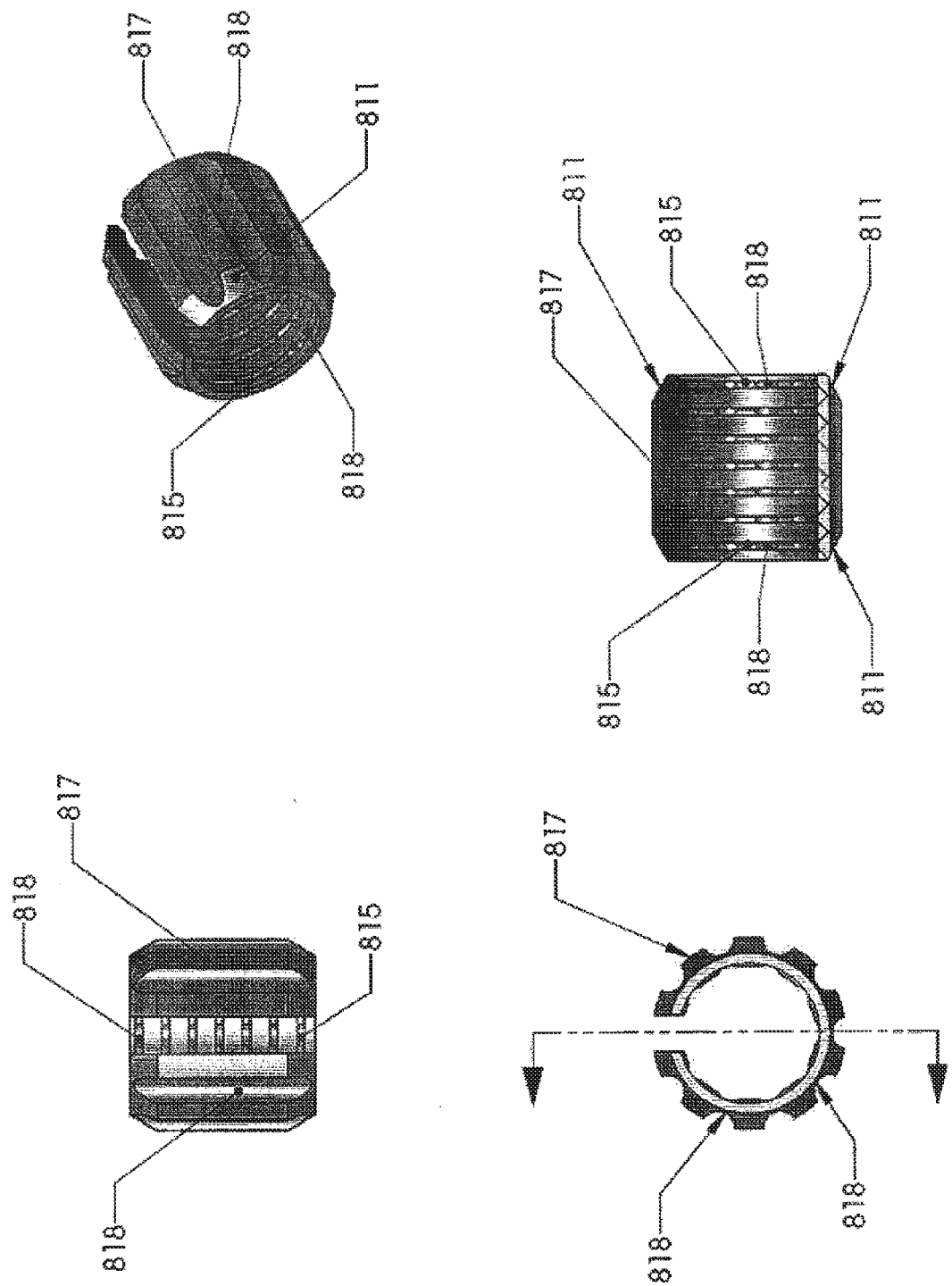
FIG. 11 illustrates a prospective, a top, a side and a cross sectional views of the insert illustrated in the application of FIGS. 1 and 8.

FIG. 11 illustrates top, side, perspective, and cross sectional views of insert 817. Insert 817 may include compression relief voids such as opening 816 and grooves 818. Each end of insert 817 may include a beveled surface 811 that, when compressed between beveled internal surface 1010 and a beveled surface of compression nut 114, may cause insert 817 to compress onto armored cable 110 inside cable connector 800. Insert 817 may also include ribs 815 extended from insert 817's inner surface proximate to an entry end of insert 817. Ribs 815 may facilitate retention of the armored cable 110 within cable connector 800 once insert 817 and ribs 815 have been compressed onto armored cable 110.

Figure 12:
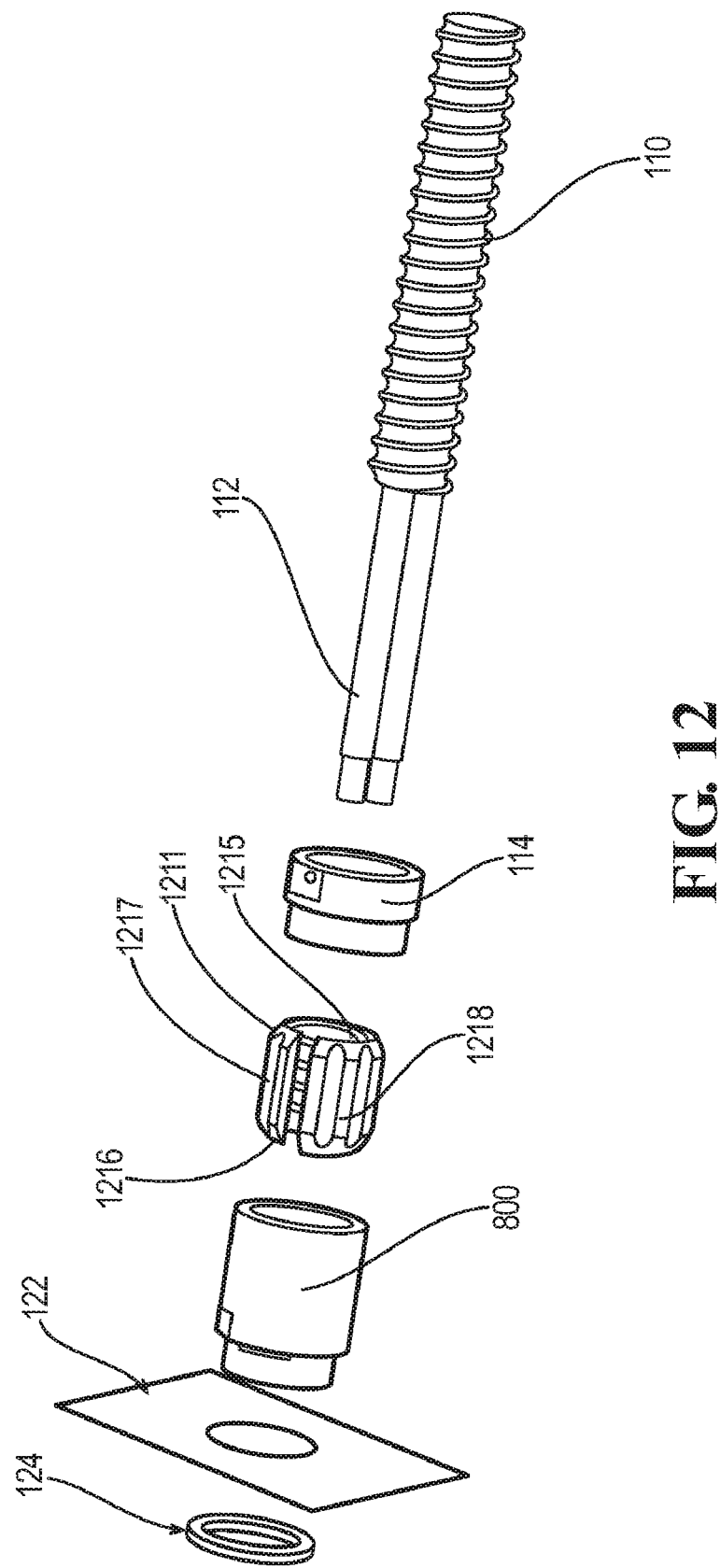
FIG. 12 an exploded perspective view of a cable connector assembly application.

FIG. 12 illustrates an exploded perspective view of a cable connector assembly having an insert 1217 according to various embodiments of the invention. Insert 1217 may include compression relief voids such as an opening 1216 and grooves 1218. Each end of insert 1217 may include a beveled surface 1211 configured to cause insert 1217 to compress onto armored cable 110 inside cable connector 800 when compressed between beveled internal surface 1010 and beveled surface of the compression nut 114 may. Insert 1217 may also include identical threads or annular rings 1215 on insert 1217's inner surface. Threads 1215 may facilitate armored cable 110 retention within cable connector 800 when insert 1217 and threads 1215 engage (i.e. grip and/or retain) armored cable 110.

Figure 13:
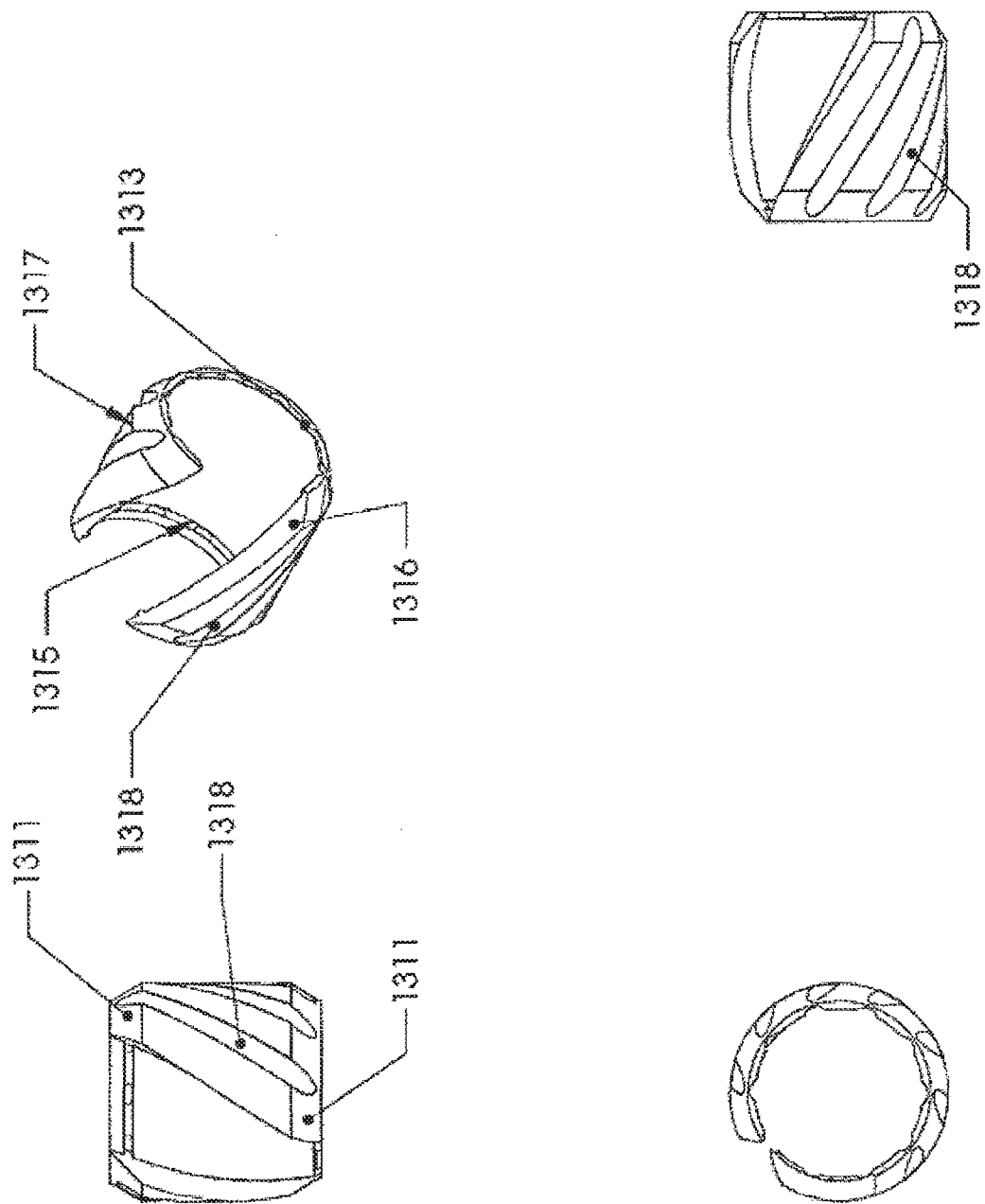
FIG. 13 illustrates perspective, top, side, and cross sectional views of an insert.

FIG. 13 illustrates top, side, perspective, and cross sectional views of an insert 1317 according to embodiments of the invention. Insert 1317 may include compression relief voids such as the opening 1316 and diagonal or helical grooves 1318. Each end of insert 1317 may include a beveled surface 1311 that, when compressed between beveled internal surface 1010 and a beveled surface of compression nut 114, may cause insert 1317 to compress around armored cable 110 inside cable connectors 100 and 800. Insert 1317 may also include ribs 1315 extending from insert 1317's an inner surface proximate to insert 1317's entry ends. Ribs 1315 may facilitate armored cable 110 retention within cable connector 100 once insert 1317 and ribs 1315 have been compressed onto armored cable 110. In addition, insert 1317 may also include an adjustable end stop 1313 adjusts the throat diameter in proportion to the adjustment of the connector diameter as the connector is closed around the armored cable jacket.

Figure 14:
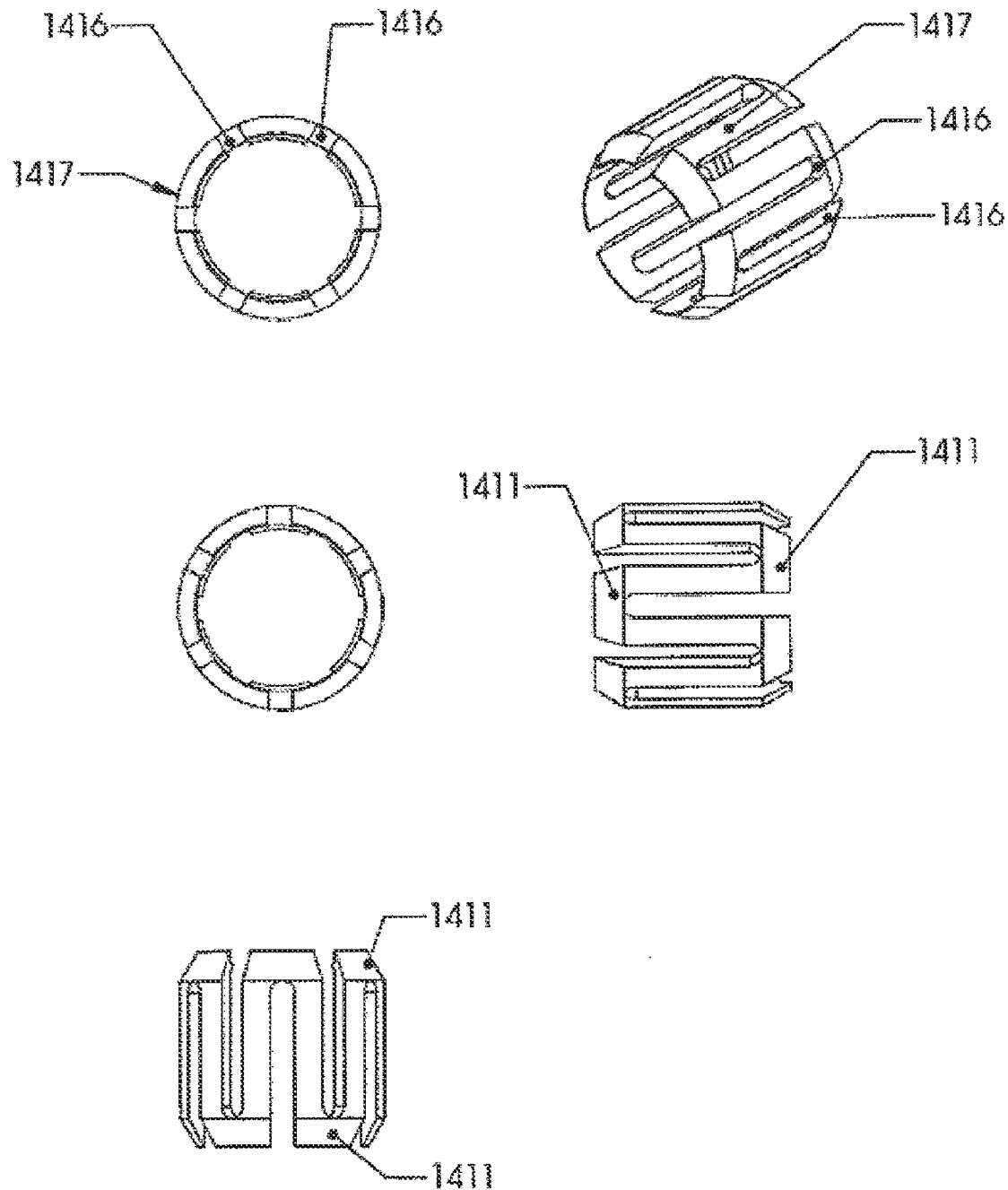
FIG. 14 illustrates perspective, top, side, and cross sectional views of an insert.

FIG. 14 illustrates top, side, perspective, and cross sectional views of an insert 1417 consistent with embodiments of the invention. Insert 1417 may include compression relief voids such as the opposing slots 1416. Opposing slots 1416 may be serpentine. Each end of insert 1417 may include a beveled surface 1411 that, when compressed between the beveled internal surface 1010 and a beveled surface of compression nut 114, may cause insert 1417 to compress onto armored cable 110 inside cable connectors 100 and 800.

Figure 15:
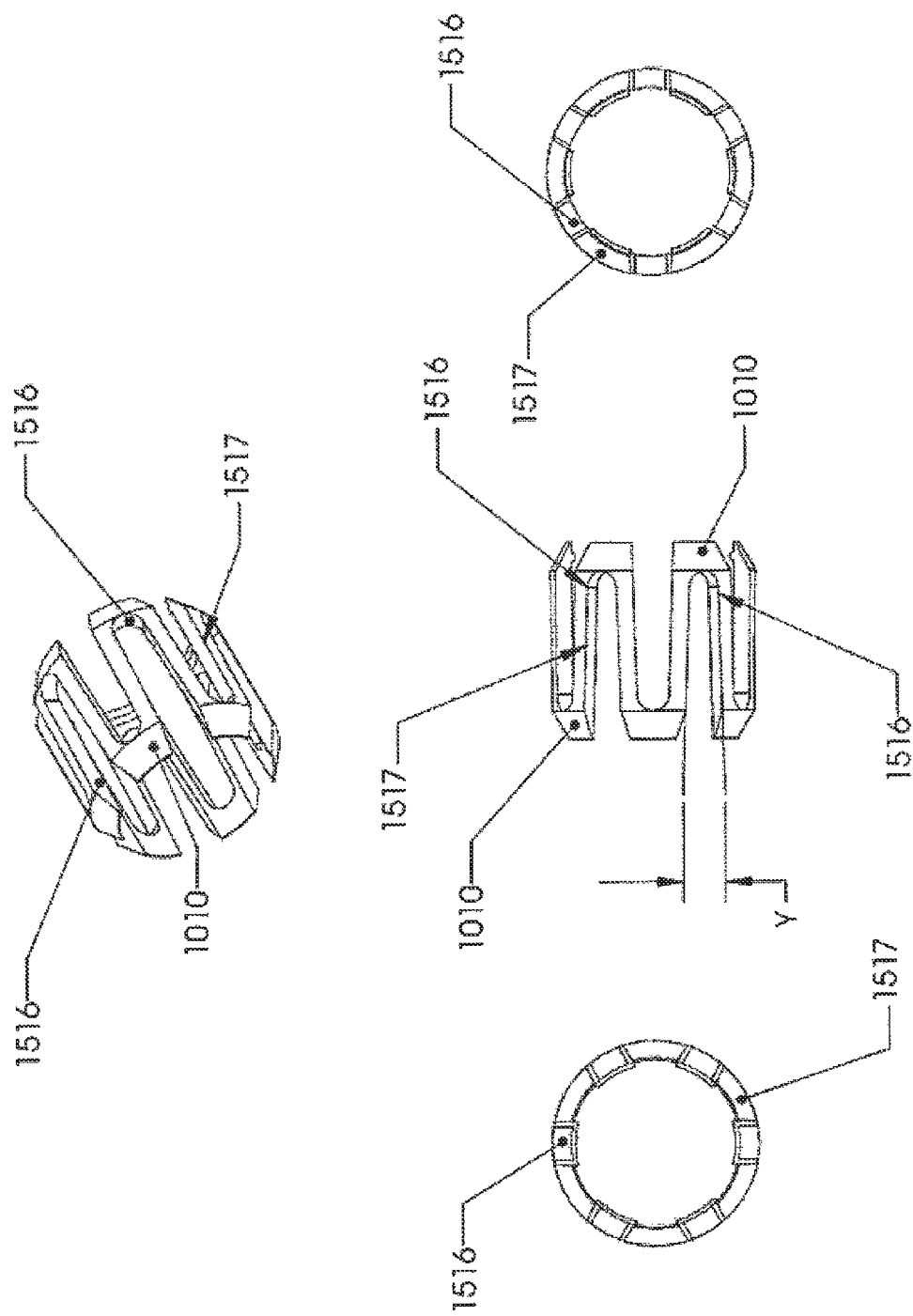
FIG. 15 illustrates perspective, top, and side views of the insert.

FIG. 15 illustrates top and side views of an insert 1517 consistent with embodiments of the invention. Insert 1517 may include compression relief voids such as the opposing slots 1516. The sidewalls of each slot may be at an angle Y to one another or in parallel as shown in FIGS. 14*a* through 14*d*. Each end of insert 1517 may include a beveled surface 1511 that, when compressed between beveled internal surface 1010 and a beveled surface of compression nut 114, may cause insert 1517 to compress onto armored cable 110 inside cable connectors 100 and 800. In addition an insert may include one or more integrated end stops. The end stops may facilitate in stopping armored cable 110 from passing through insert 1517.

Figure 16:
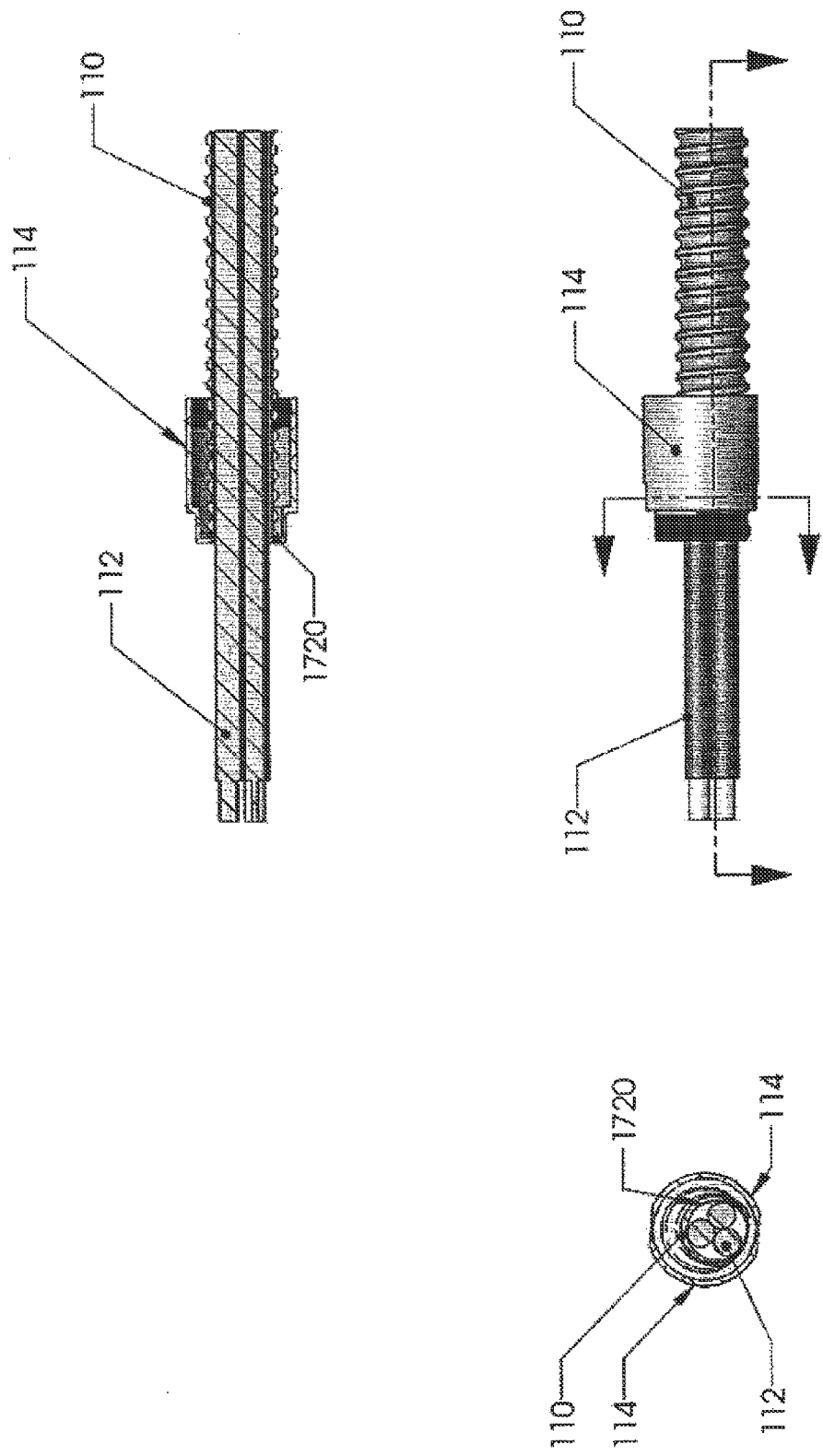
FIG. 16 illustrates a compression housing having an integrated off set end stop.

FIG. 16 illustrates compression nut 114 may have an integrated off-set end stop 1720. In embodiments of the present invention, compression nut 114 may be configured such that end stop 1720 may include a single lip having a larger throat size to provide an end stop for a variety of cable sizes. During armored cable 110 installation, a user may insert armored cable 110 into compression nut 114 such that armored cable 110's arm comes to rest against end stop 1720. After armored cable 110 has been inserted into compression nut 114, cable connector 100 may be assembled as described above with respect to FIG. 1.

Figure 17:
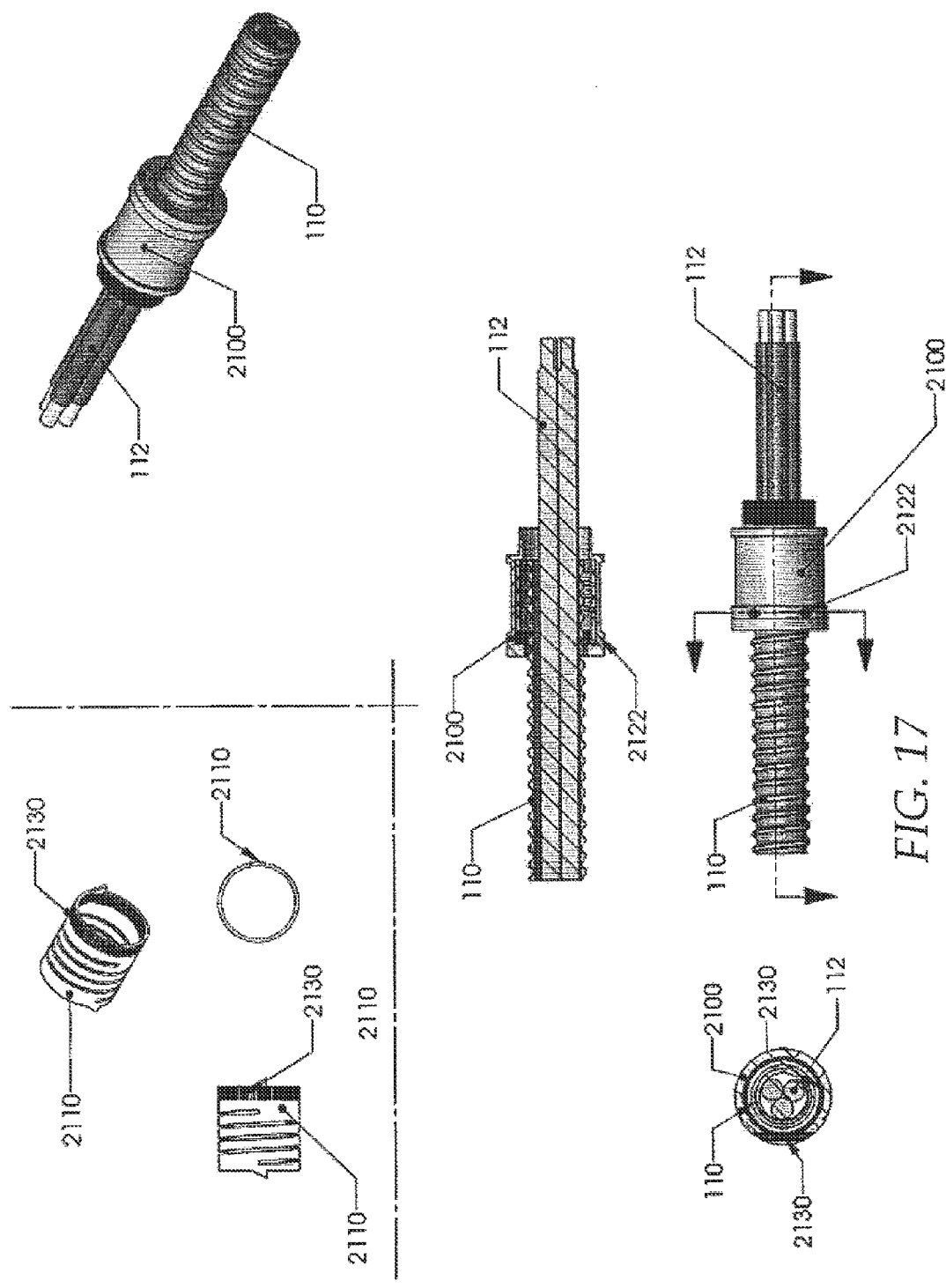
FIG. 17 illustrates a cable connector including a constricting band.

FIG. 17 illustrates a cable connector 2100 that may include a constricting band 2110. Tightening or loosening a set screw 2122 that is tangential to a housing 2120 adjusts constricting band 2110. Screw 2122 may engage a worm gear or rack and pinion mechanism 2130 such that, as screw 2122 is tightened, constricting band 2110 may be tightened against armored cable 110.

Figure 18:
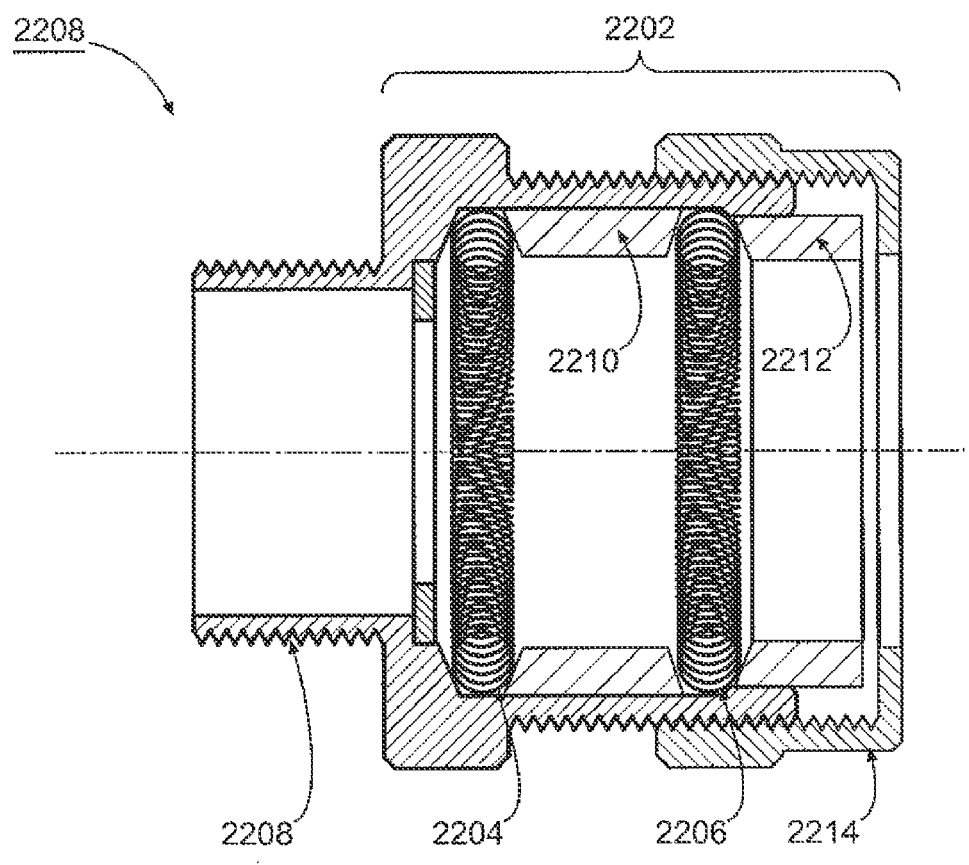
FIG. 18 illustrates a cable connector including a coil spring lock.
Figure 18:
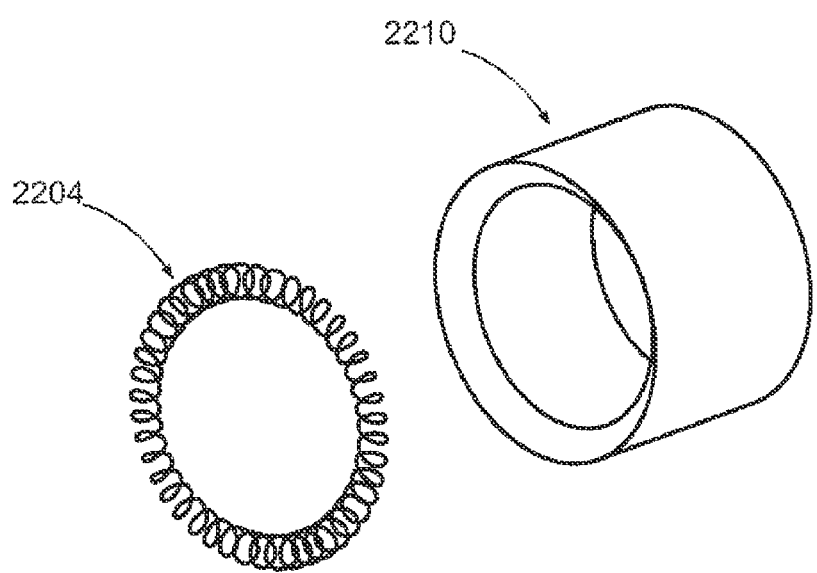

FIG. 18 illustrates a cable connector 2200 that may include a double coil spring lock 2202. Cable connector 2200 may include at least one helical coiled spring 2204 and 2206 that may be wrapped in an annular fashion in various locations within cable connector 2200. A first location may be at the inner top end of a housing 2208 and may form an end stop to strict an armored cable's armor from passing through housing 2208 while still allowing conductors to pass through housing 2208. A second location of coiled spring 2206 may be at the bottom of housing 2208 where a spacers/inserts 2210 and 2212 including a beveled surface. Spacers/inserts 2210 and 2212 may engage coil springs 2204 and 2206 as a compression nut 2214 closes onto housing 2208 and my cause coil springs 2204 and 2206 to engage the armored cable's armor mechanically and electrically. Spacers/inserts 2210 and 2212 may be placed between housing 2208 and compression nut 2214 below coil spring 2206. Coiled spring 2204 may serve as an end stop may be of a larger diameter than coil spring 2204 that may provide a mechanical and electrical connection to the armored cable's armor.

Figure 19:
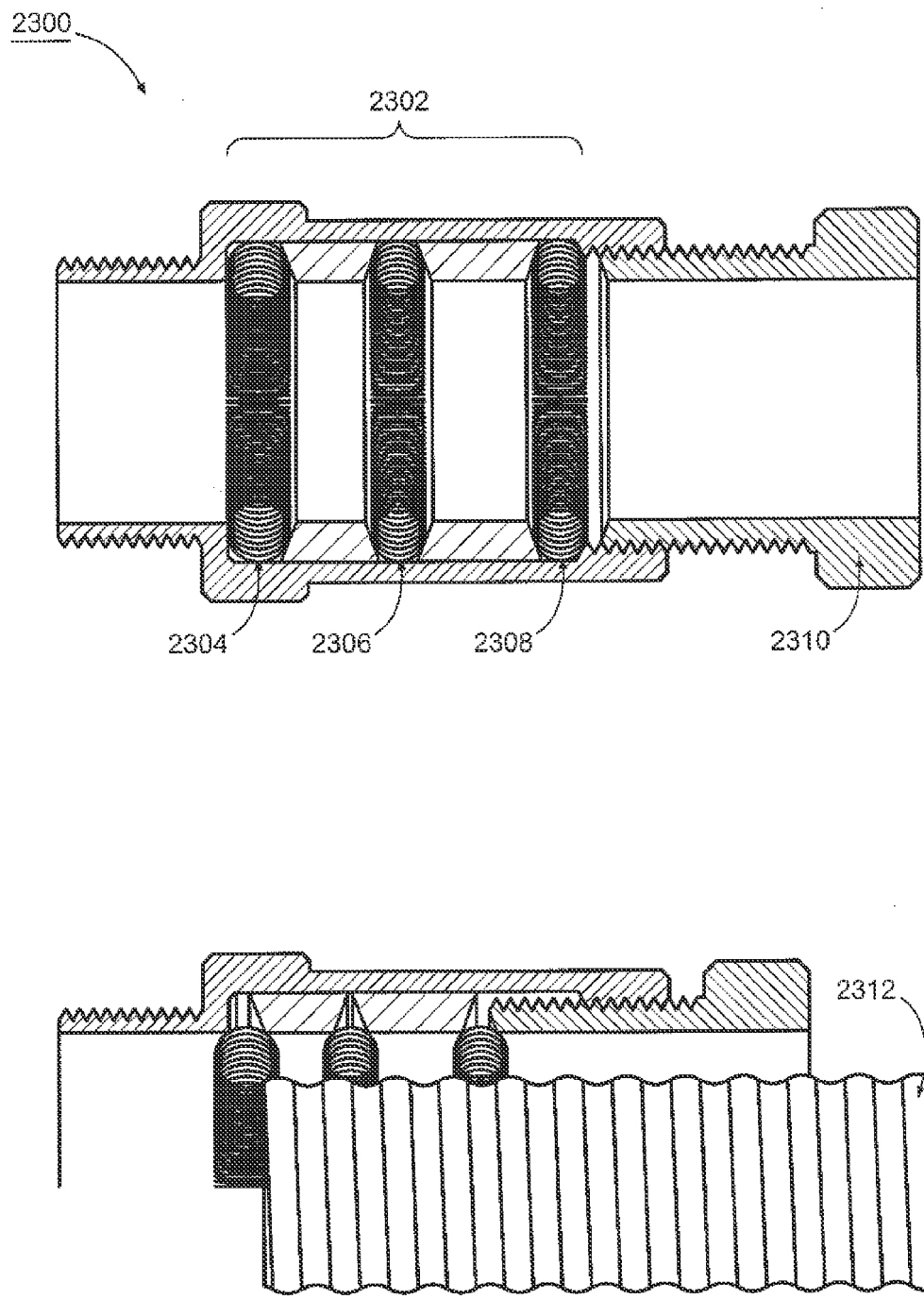
FIG. 19 illustrates a cable connector including a coil spring lock with an adjustable end stop.

FIG. 19 illustrates a cable connector 2300 that may include a coil spring lock 2302 with an end stop that may be adjustable. Cable connector 2300 may include three or more coil springs 2304, 2306, and 2308 and may exclude a spacer. A compression nut 2310 may exert a force against spring 2304 to hold spring 2304 in place as spring 2306 and/or 2308 engage and armored cable's armor 2312 mechanically and/or electrically. Any of springs 2304, 2306, and 2308 may act as an end stop. The end stop spring may be of a larger size than the other springs.

Figure 20:
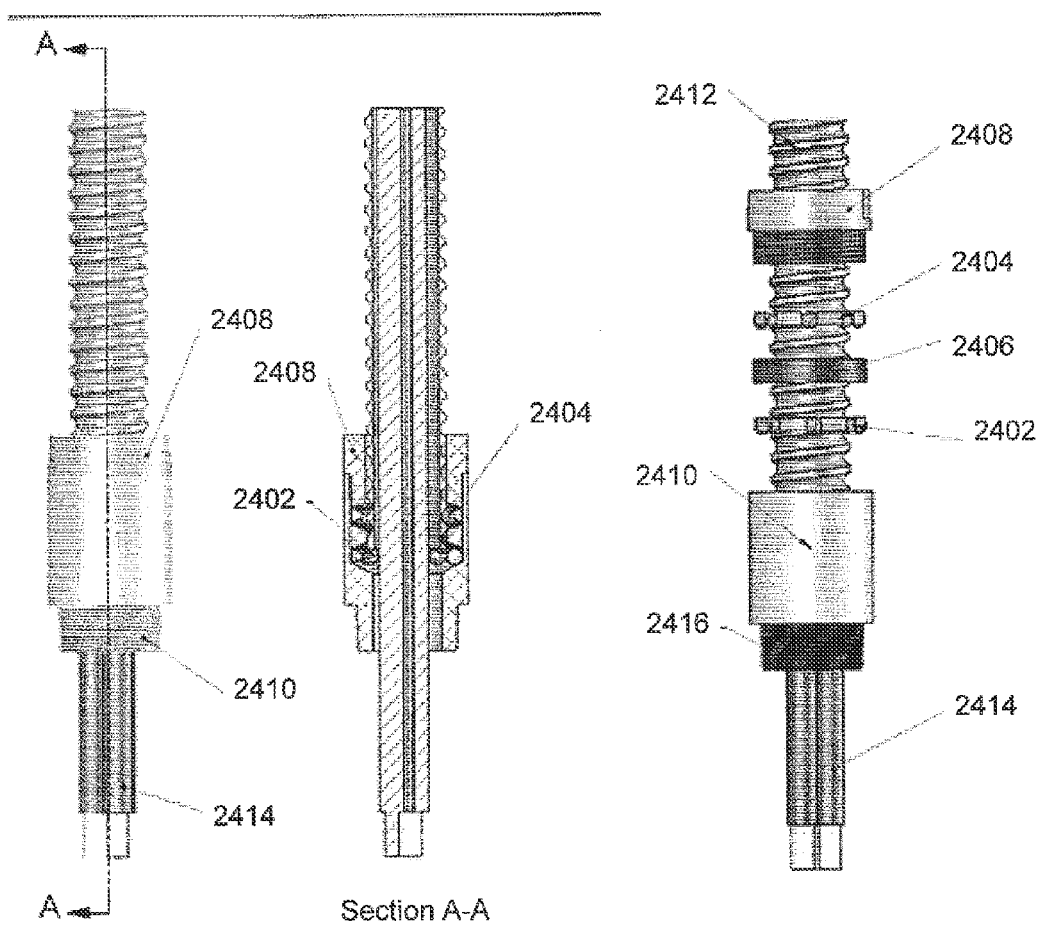
FIG. 20 illustrates a cable connector including a ball cage.

FIG. 20 illustrates a cable connector 2400 that may include at least one ball cage 2402 and/or 2404. Cable connector 2400 may provide for increased force against armor an armored cable's armor 2412. A compression nut 2408 may engage a housing 2410 and may exert a force against ball cages 2402 and 2404. Ball cages 2404 and 2406 may engage armored cable's armor 2412 mechanically and/or electrically. When more than one ball cage is utilized, a space 2406 may be used to separate ball cages 2402 and 2404. In addition, either of ball cages 2404 and/or 2406 may serve as an end stop to allow conductors 2414 to pass through housing 2410 and hinder armored cable's armor 2412 from passing through housing 2410. Ball cages 2404 and 2406 may be constructed of the same or differing materials. For example, ball cage 2404 may be constructed out of steel while ball cages 2406 and 2408 may be constructed out of aluminum. Other conductive and non-conductive materials may be used to construct ball cages 2404, 2406, and 2408.

Figure 21:
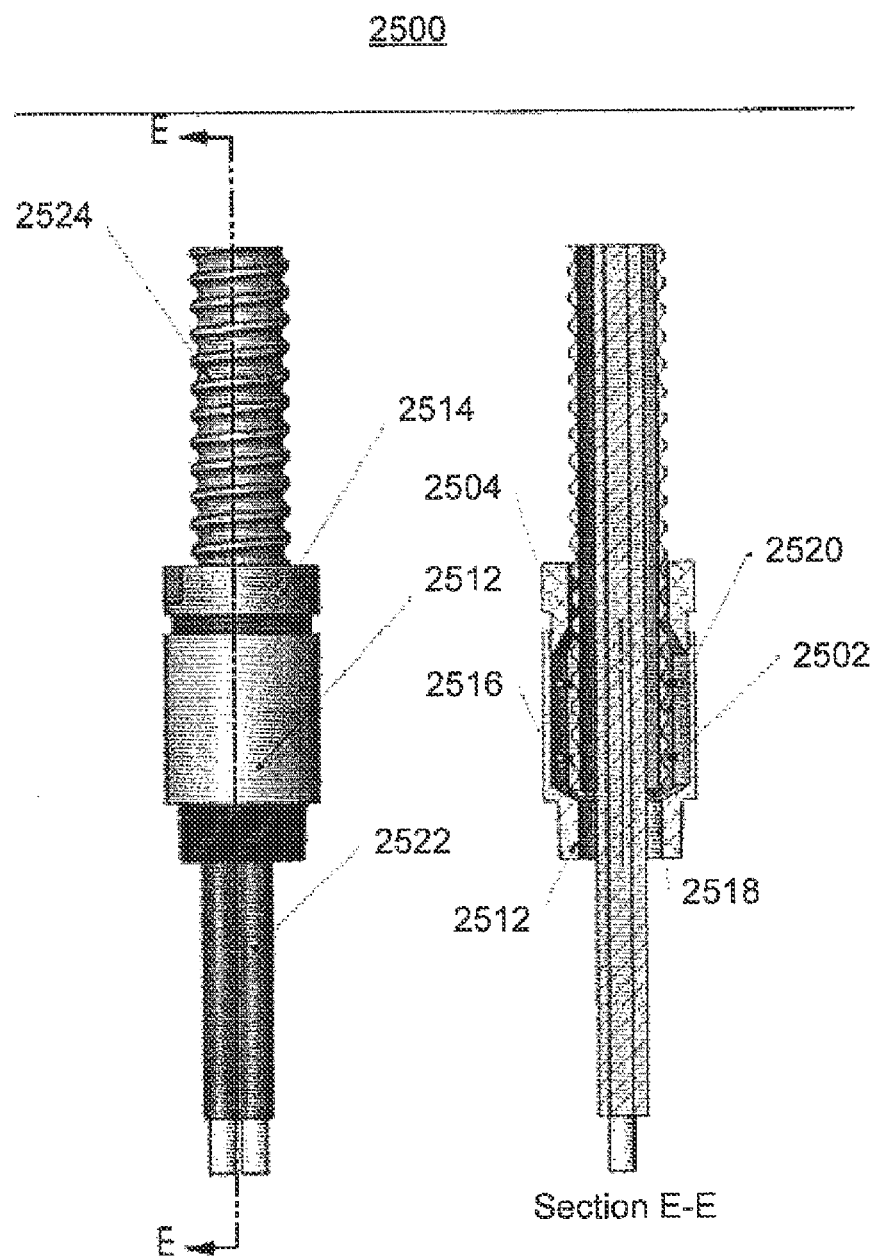
FIG. 21 illustrates a cable connector including an insert.

FIG. 21 illustrates a cable connector 2500 that may include an insert 2502. Insert 2502 may comprise various members. Insert 2502 may collapse and compress onto an armored cable's armor 2524. Insert 2502 may comprise beveled surfaces that may interact with beveled surfaces on a housing 2512 and a compression nut 2514. Insert 2502 may further comprise prongs 2516 and 2518 that may serve as an end stop to allow conductors 2522 to pass through housing 2512 and hinder armored cable's armor 2512 from passing through housing 2512. Insert 2502 may further comprise internal ribs 2520 that engage the armored cable's armor 2512 mechanically and/or electrically. Cable connector 2500 may also comprise a display that may assist in terminating the armored cable. Insert 2502 may expand when compression nut 2514 is loosened from housing 2512 to facilitate replacing the armored cable and/or cable connector 2500.

Figure 22:
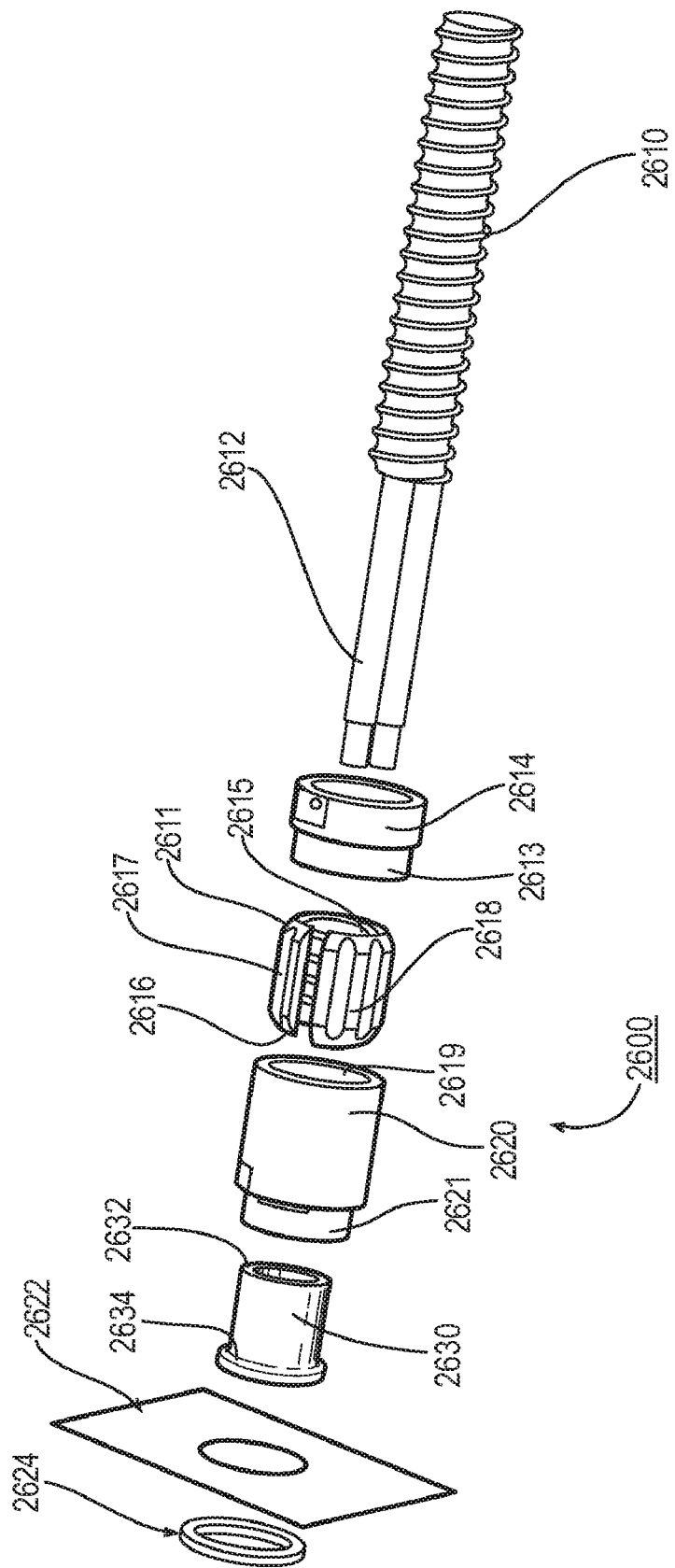
FIG. 22 is an exploded perspective view of a cable connector assembly application.

FIG. 22 depicts an exploded perspective view of a cable connector assembly consistent with embodiments of the invention. Cable connector 2600 may include a connector housing 2620 having an external threaded portion 2621 and an internal threaded portion 2619, a plastic insert end stop 2630, and a compression nut 2614 having an external threaded portion 2613. Cable connector 2600 also may include an insert or gland 2617, and a lock nut 2624 for engaging the external threaded portion 2621 of the connector housing 2620. The plastic insert end stop 2630 may have a narrow end 2632 and a wide end 2634; the outside diameter of the wide end 2634 may be larger than the outside diameter of the narrow end 2632. The wide end 2634 may comprise a flange. In some embodiments, the inside diameter of the wide end 2634 may be substantially the same as the inside diameter of the narrow end 2632, i.e., the inside surface of the plastic insert end stop 2630 may be substantially cylindrical. Additionally, the outside diameter of the wide end 2634 may be larger than the inside diameter of the external threaded portion 2621 or the connector housing 2620. The insert or gland 2617 may include compression relief voids or cavities, or other features of inserts or glands described in other embodiments disclosed herein. For instance, the insert or gland 2617 may have an opening 2616, and/or grooves 2618, and/or a beveled surface 2611, and/or annular threads or rings 2615.

Cable connector 2600 may be used to ground an armored cable 2610 and secure armored cable 2610, including conductors 2612, to an enclosure 2622. In addition, cable connector 2600 may include attributes that may act as a barrier to prevent moisture and other contaminants from entering the enclosure 2622 and/or the connector 2600. Enclosure 2622 may be made from steel and may include structures such as junction boxes, panel boards, motor control enclosures, electrical distribution equipment, and other electrical enclosures. Connector components such as connector housing 2620, insert or gland 2617, and compression nut 2614 may comprise any electrically conductive material, such as aluminum or zinc plated steel. One or more of cable connector 2600's components also may be tempered by, for example, post annealing or employing pre-tempered metal stock for which the parts may be fabricated. The plastic insert end stop 2630 may comprise any plastic material, for instance, a thermoplastic material. In some embodiments, the plastic insert end stop 2630 may serve as an insulator for conductors 2612. The plastic insert end stop 2630 may be configured to hinder armor of the armored cable 2610 from passing through the cable connector 2600 while allowing conductors 2612 of the armored cable 2610 to pass through. In some embodiments, the thickness of the plastic insert end stop 2630, or the distance between the inside of the plastic insert end stop 2630 and the outside of the narrow end 2632 or the wide end 2634, may be varied to cover a range of armored cable sizes or trade sizes.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A cable connector comprising:
   a connector housing having an engaging portion;
   an insert end stop having a narrow end and a wide end, the insert end stop configured to be inserted into the connector housing; and
   a compression nut configured to engage the engaging portion, wherein the insert end stop is configured as an end stop to hinder armor of an armored cable from passing through the cable connector while allowing conductors of the armored cable to pass through.

2. The cable connector of claim 1, wherein at least one of the following is electrically conductive: the connector housing, the insert end stop, and the compression nut.

3. The cable connector of claim 2, wherein the insert end stop comprises an electrically conductive material.

4. The cable connector of claim 1, wherein the insert end stop is configured to cover at least one of the following:
   a trade size; and
   a range of at least two trade sizes.

5. The cable connector of claim 1, wherein an inside diameter of the insert end stop is dimensioned based on an outside diameter of the conductors of the armored cable.

6. The cable connector of claim 1, wherein an outside diameter of the wide end of the insert end stop is larger than an outside diameter of the narrow end of the insert end stop.

7. The cable connector of claim 1, wherein an outside diameter of the wide end of the insert end stop is larger than an inside diameter of the connector housing.

8. The cable connector of claim 1, wherein the wide end of the insert end stop comprises a flange.

9. The cable connector of claim 1, wherein an inside surface of the insert end stop is substantially cylindrical.

10. The cable connector of claim 1, further comprising a nut for engaging an external threaded portion of the connector housing to secure the cable connector and the armored cable to an enclosure.

11. A cable connector comprising:
    a connector housing comprising a first end having an external threaded portion and a second end having an adjustable inside diameter; and
    an insert end stop having a narrow end and a wide end, the insert end stop configured to be inserted into the connector housing, wherein the insert end stop is configured as an end stop to hinder armor of an armored cable from passing through the cable connector while allowing conductors of the armored cable to pass through.

12. The cable connector of claim 11, wherein the connector housing comprises a shoulder configured to hinder armor of the armored cable from passing through the connector housing while still allowing the conductors of the armored cable to pass through the connector housing.

13. The cable connector of claim 11, wherein the insert end stop comprises a thermoplastic material.

14. The cable connector of claim 11, wherein an inside surface of the insert end stop is substantially cylindrical.

15. The cable connector of claim 11, wherein the wide end of the insert end stop comprises a flange.

16. The cable connector of claim 11, wherein an outside diameter of the wide end of the insert end stop is larger than an outside diameter of the narrow end of the insert end stop.

17. The cable connector of claim 11, wherein an outside diameter of the wide end of the insert end stop is larger than an inside diameter of the first end of the connector housing.

18. The cable connector of claim 11, wherein the connector housing comprises an electrically conductive material.

19. A cable connector comprising:
    means for securing an armored cable comprising conductors to an enclosure, the means for securing comprising a first end having an external threaded portion;
    an insert end stop having a narrow end and a wide end, the insert end stop configured to be inserted into the means for securing, wherein the insert end stop is configured as an end stop to hinder armor of the armored cable from passing through the cable connector while allowing the conductors of the armored cable to pass through.

20. The cable connector of claim 19, wherein the means for securing comprises an electrically conductive material.

21. The cable connector of claim 19, further comprising a nut for engaging the external threaded portion to secure the cable connector and the armored cable to the enclosure.

22. The cable connector of claim 19, wherein an outside diameter of the wide end of the insert end stop is larger than an inside diameter of the first end of the means for securing.

23. The cable connector of claim 19, wherein the wide end of the insert end stop comprises a flange.

24. The cable connector of claim 19, wherein the insert end stop comprises a thermoplastic material.

* * * * *